3,830,740
PROCESS FOR THE PRODUCTION OF CARBON OR GRAPHITE FOAM CONTAINING HOLLOW CARBON MICROSPHERES

Yasuo Amagi, Kazuo Noguchi, and Satoshi Inada, Tokyo, Japan, assignors to Kureha Kagaku Kogyo Kabushiki Kaisha, Tokyo, Japan
Filed June 23, 1972, Ser. No. 265,751
Claims priority, application Japan, June 30, 1971, 46/47,302
Int. Cl. C01b 31/02; C04b 43/00
U.S. Cl. 252—62       5 Claims

ABSTRACT OF THE DISCLOSURE

A process for the production of carbon foam or graphite foam having improved heat insulating characteristics and a high content of dispersed minute balloons therein. The process involves foaming and then baking a mixture of a resin and hollow carbon microspheres. The product formed thereby.

BACKGROUND OF THE INVENTION

This invention relates to carbon and graphite foams and to a process for producing same. The prior art discloses a number of processes for the production of carbonized foams from synthetic resins such as phenolics, urethanes, etc. For example, U.S. Pats. Nos. 3,121,050 and 3,342,555 discloses processes for producing carbon foam by baking a phenolic foam. U. S. Pat. No. 3,302,999 teaches a process for the production of a carbon foam by baking a urethane foam.

Such processes, however, suffer from the disadvantage of a low carbonization rate which tends to produce a high degree of shrinkage. In prior art processes wherein polyurethane is the starting material, the shrinkage or volumetric contraction of the synthetic resin foam amounts to 60 to 75%. Production of a carbon foam from a phenolic involves about a 50% volumetric contraction.

To avoid shrinkage during carbonization U.S. Pat. No. 3,302,999 proposes that urethane foams first be subjected to maturing and "infusibilization" treatments. In the process of U.S. 3,302,999, a hard urethane foam of a polyester type is heated at a temperature of from 150° C. to 200° C. for 8 to 24 hours for hardening or curing. It is then subjected to an oxidation treatment, wherein the foam is heated at a temperature of 200° to 250° C. in an atmosphere containing oxygen for over 24 hours. The volumetric contraction for such a pre-treated urethane foam during the carbonization treatment falls within the range from 25 to 40%. If the pre-treatment is not carried far enough, e.g. heating at 200° C. for less than 16 hours, then the foam is likely to fuse during the baking operation, resulting in a deformed shape.

The prior art also includes methods for improving the quality of carbon foam by adding various kinds of additives to the starting resin (phenolic or urethane) and then baking. For example, U.S. Pat. No. 3,387,940 describes a process for producing a carbon foam having relatively high strength, by adding carbonaceous materials such as graphite, carbon black, etc., to a resin which forms a hard urethane polyester foam. However, this process fails to provide light synthetic resin foams because of the relatively high density of the additives as compared to that of the synthetic resin foam.

SUMMARY OF THE INVENTION

The present invention provides a high quality carbon or graphite foam by adding hollow carbon microspheres to a phenolic or urethane resin, foaming the mixture, and baking the foam to carbonize or graphitize same.

Accordingly, it is an object of the present invention to provide carbon and graphite foams of relatively high strength.

It is yet another object of the present invention to provide a resinous foam that may be carbonized at a relatively high rate with only minimal shrinkage.

Other objects and further scope of applicability of the present invention will become apparent from the detailed description to follow.

DESCRIPTION OF THE PREFERRED EMBODIMENTS OF THE INVENTION

Figure 1:
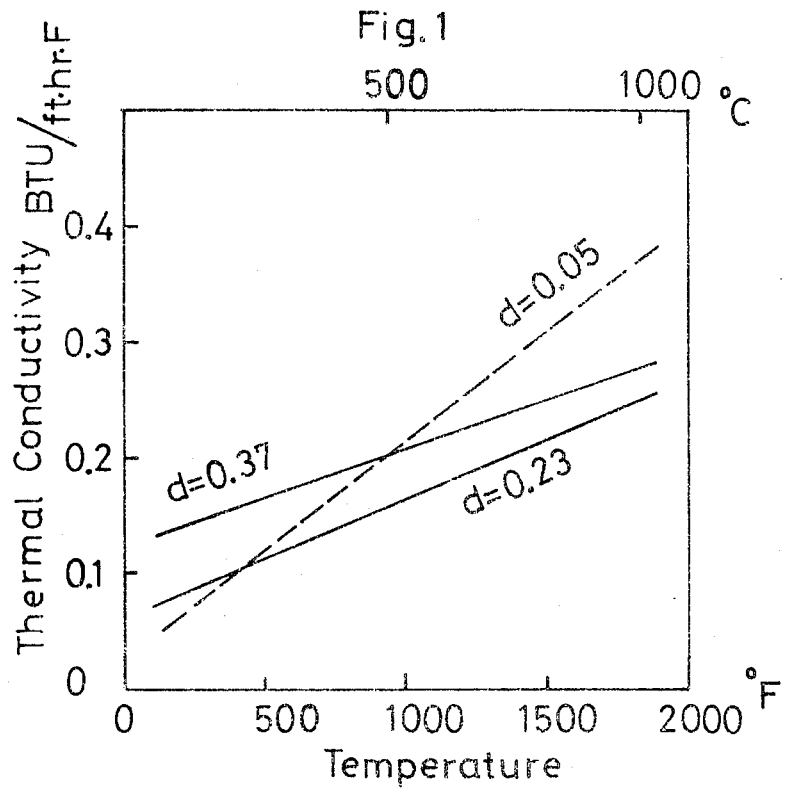
FIG. 1 is a graph showing the thermal conductivity of various carbon foams over a wide temperature range. The least dense foam ($d=0.05$) is a prior art form.

The hollow carbon microspheres used in the present invention are those disclosed in our U.S. Application Ser. No. 147,712, filed May 27, 1971, the teaching of which is hereby incorporated by reference. That application discloses hollow carbon microspheres having an average diameter of from $10\mu$ to $500\mu$ and a bulk density of from 0.05 to 0.50 g./cc. The hollow carbon microspheres used in the present invention should preferably have an average diameter of from $50\mu$ to $500\mu$ and a bulk density of from 0.1 to 0.3 g./cc. The hollow carbon microspheres may be added to the starting resin in a ratio of 5 to 90 parts of microspheres per 100 parts resin, and preferably 10 to 80 parts of microspheres per 100 parts resin (by weight).

It has been found that the shrinkage of the resin foam during baking can be reduced to about one-half that of the unfilled urethane foam by adding hollow carbon microspheres to the starting urethane resin in an amount of 20% by weight of the starting resin. Furthermore, the volumetric contraction of the material can be reduced to 10% of the original volume by adding hollow carbon microspheres to the starting resin of a phenolic foam. Even if the resin foam is subjected to an oxidation treatment carried out at 200° C. for 16 hours, the addition of 10% by weight of hollow carbon microspheres to the starting resin of a urethane foam eliminates the fusing phenomenon and deformation.

In the prior art processes, the cells of the synthetic resin foam are likely to be ruptured during the baking operation, due to the low carbonization degree of the synthetic resin, with the result that the carbon foams so produced are 70% to 90% by volume open-celled. The rupturing of the cell walls during carbonization results in lowered heat insulating values at the elevated temperature applications in which carbon foams are commonly used. In contrast, the carbon foam produced according to the present invention, has a high content of independent minute balloons, which feature provides excellent heat insulating values at high temperatures.

For example, the carbon foam produced from a phenolic resin foam according to the process of U.S. Pat. No. 3,121,050, has a bulk density of 2.91 lb./ft.$^3$ and a heat insulating value of 0.383 B.t.u.-in./ft.$^2$-hr.°-F. at 50° F. In contrast, a carbon foam produced by baking a phenolic resin foam containing 70% by volume hollow carbon microspheres, has a heat insulating value as low as 0.24 B.t.u.-in./ft.$^2$-hr.-° F., even with a bulk density of 8.1 lb./ft.$^3$. Carbon foams are often used in a vacuum or in an inert atmosphere (nitrogen) at elevated temperatures. When a conventional carbon foam is employed at elevated temperatures in a nitrogen atmosphere, it has a relatively high thermal conductivity due to the convection of the nitrogen gas. The performance of a carbon foam as an insulating material largely depends on the construction of the carbon foam, however, the carbon foam of the present invention is not as susceptible to heat transfer by convection as are the conventional carbon foams.

FIG. 1 compares the thermal conductivity of conventional carbon foam with that of the carbon foam of the present invention. FIG. 1 shows that the prior art carbon foam possesses a lower thermal conductivity at the lower temperatures (due to its low bulk density) and that it has a higher thermal conductivity at elevated temperatures.

Another advantage of a carbon foam having hollow carbon microspheres is the low hygroscopicity of the carbon foam. The process for producing carbon foams disclosed in U.S. Pat. No. 2,845,396 involves the addition of foaming accelerators (e.g. sodium carbonate) and of alkaline catalysts (e.g. barium hydroxide or sodium hydroxide) to the phenol formaldehyde resin. These inorganic additives result in a relatively high ash content in the carbon foam produced by baking (carbonizing or graphitizing) the phenolic foam. The high ash content of this prior art carbon foam results in appreciable hygroscopicity. In contrast, the carbon foam of the present invention has low hygroscopicity, because the ash content of the hollow carbon microspheres is as low as 0.3% and because the hygroscopicity of the microspheres may be minimized by regulation of the baking temperature.

Figure 2:
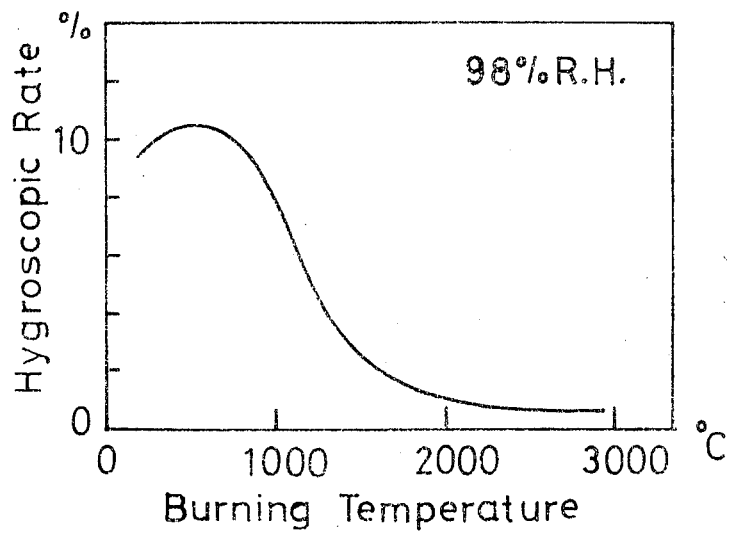
FIG. 2 is a graph showing the relationship between the baking temperature used to form the foam of the present invention and the hydroscopic rate for the foam so produced.

FIG 2 shows the relationship between the baking temperature and the hygroscopicity of the carbon foam product. As is apparent from this figure, baking temperatures of over 1,000° C., and preferably, in excess of 1,500° C., result in carbon foams having low hygroscopicity. On the other hand, in the case of prior art carbon foams containing alkali salts, the raising of the baking temperature does not appreciably lower hygroscopicity.

The advantages of the present invention over the prior art may be summarized as follows:

(1) The curing and "infusibilization" time required for treatment of the synthetic resin foam starting material is less.

(2) The volumetric contraction and weight loss of the synthetic resin foam during the baking operation is less, which serves to prevent fusion, deformation, cracks and so forth to give a high yield of quality product.

(3) The carbon foam has a high content of independent (closed-cell) minute balloons that provide improved heat insulating properties.

(4) The use of the hollow carbon microspheres having low hygroscopicity results in a carbon foam having low hygroscopicity.

In the process of the present invention the hollow carbon microspheres are preferably added to the resin liquid beforehand. A conventional type mixer may be employed for mixing such synthetic resin with the hollow carbon microspheres. When the amount of the hollow carbon microspheres is relatively small, a low r.p.m. mixer may be used. Conversely, when the amount of hollow carbon microspheres is relatively large, a kneader type mixer is preferred and, if necessary, the mixing may be carried out in vacuum. In cases where the synthetic resin to be employed is in the form of a powder, such as a novolak type phenolic resin, it is preferred that the hardener and foaming accelerator be uniformly added to the fused resin maintained in the fused state on heating rolls, that the mixture then be pulverized, and that thereafter the hollow carbon microspheres be added to the pulverized mixture. For mixing with powders, a double cone or V type powder mixer may be used. The blended powders are then poured into a mold and cured.

The baking of the synthetic resin foam containing hollow carbon microspheres is conducted in an inert atmosphere, such as nitrogen, at 1,000° C. Alternatively, the baking may be conducted by placing the synthetic resin foam in a graphite crucible and electrically heating up to 3,000° C. The duration of the baking time is approximately the same as that of conventional processes, normally for about 30 hours.

The present invention will now be described in greater detail by means of the following examples:

EXAMPLE 1

Hollow carbon microspheres (average diameter of 100μ, a bulk density of 0.15 g./cc.) were added to a bi-liquid type hard urethane liquid reactant (trade nomenclature, Air Light Foam, made by Nissin-Booseki Company) and a foam was produced therefrom.

More specifically, the hollow carbon microspheres were added in a given amount to each of the two liquids, and thereafter the two liquids were mixed together and poured into a mold 150 x 150 x 50 mm. After the mixture had been foamed in the mold, the foamed body was cut to the dimensions of 90 x 30 x 30 mm. and subjected to oxidation in air at 200° C. for 16 hours and then baked in a nitrogen atmosphere at 1,000° C. for 16 hours. The bulk density of the foamed body, after the baking, was 0.12 g./cc. in average, ranging from 0.10 to 0.14 g./cc. Table 1 indicates that the volumetric contraction and weight loss are decreased in proportion to the amount of hollow carbon microspheres added. In the runs where urethane was used alone or with the addition of 5% by weight of carbon microspheres, the center portion of the carbon foam product was found fused. Oxidation at 200° C. for 48 hours resulted in the fused center portion of the urethane foam. The time required for the "infusibilization" treatment was greatly shortened.

TABLE 1.—THE EFFECT OF THE ADDITION OF HOLLOW CARBON MICROSPHERES TO THE URETHANE FOAMS

| Composition of starting material (by weight) | | Volumetric contraction rate on baking, percent | Weight loss on baking, percent | Compressive strength of carbon foam, kg./cm.² | Condition of carbon foam |
| --- | --- | --- | --- | --- | --- |
| Hollow carbon microspheres | Urethane foam | | | | |
| 0 | 100 | 70 | 75 | ---------- | Center portion fused. |
| 5 | 95 | 64 | 67 | 10.5 | Partially fused. |
| 10 | 90 | 58 | 65 | 12.0 | No fused portion. |
| 15 | 85 | 48 | 59 | 12.0 | Do. |
| 20 | 80 | 36 | 57 | 11.5 | Do. |
| 30 | 70 | 30 | 44 | 10.0 | Do. |

EXAMPLE 2

Commercially available resin powders of the type used to form novolak phenolic foams (trade nomenclature, Hi-Lack A–50, Chūgoku Kako Company) were mixed with hollow carbon microspheres of the type used in Example 1. The mixture was poured into a 100 x 100 x 30 mm. mold and cured at 140° C. for 15 minutes. The cured body was cut to the dimensions of 90 x 30 x 30 mm. and baked in a nitrogen atmosphere at 1,000° C. for 30 hours. The bulk density of the baked body was 0.2 g./cc. in average, ranging from 0.18 to 0.22 g./cc. Table 2 indicates the effect of adding hollow carbon microspheres to the resin precursor. This table shows that the volumetric contraction and weight loss are decreased for phenolic foams in proportion to the amount of carbon microspheres added. The compressive strength was increased by addition of the carbon microspheres, presenting a peak at approximately the composition of 60/40. Reduced hygroscopicity was also noted. The hygroscopicity of the hollow carbon microspheres used was determined to be 13%.

TABLE 2.—THE EFFECTS OF THE HOLLOW CARBON MICROSPHERES ON PHENOLIC FOAMS

| Composition of starting material (ratio by weight) | | Volumetric contraction rate on baking at 1,000° C., percent | Weight loss on baking at 1,000° C., percent | Compressive strength of carbon foam, kg./cm.$^2$ | Hygroscopicity (50% RH) |
|---|---|---|---|---|---|
| Hollow carbon microspheres | Phenolic foam | | | | |
| 0 | 100 | 46 | 40 | 16 | 16 |
| 15 | 85 | 40 | 31 | 27 | 15 |
| 30 | 70 | 23 | 25 | 27 | 15 |
| 45 | 55 | 14 | 22 | 30 | 15 |
| 60 | 40 | 9 | 17 | 35 | 14 |
| 75 | 25 | 5 | 12 | 28 | 14 |
| 90 | 10 | 3 | 6 | 13 | 14 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A process for the production of a carbon foam comprising:

mixing 5–90 parts by weight hollow carbon microspheres with 100 parts by weight of a foamable synthetic resin;
   foaming the mixture; and
   baking the foamed mixture in an inert atmosphere at a temperature within the range of from about 1,000° C. to about 3,000° C. to produce the carbon foam.

2. The process of claim 1 wherein said hollow carbon microspheres have an average diameter of $10\mu$ to $500\mu$ and a bulk density of from 0.05 to 0.50 g./cc.

3. The process of claim 1 wherein said synthetic resin is a bi-liquid urethane resin system.

4. The process of claim 1 wherein said synthetic resin is a novolak phenolic resin powder.

5. A carbon foam comprising a plurality of hollow carbon microspheres dispersed in a matrix of a foamed and carbonized synthetic resin.

References Cited
UNITED STATES PATENTS

| | | | |
|---|---|---|---|
| 3,302,999 | 2/1967 | Mitchell | 423—448 |
| 3,635,676 | 1/1972 | Sands | 423—449 |
| 3,121,050 | 2/1964 | Ford | 423—448 |
| 3,387,940 | 6/1968 | McHenry et al. | 423—448 |
| 3,342,555 | 9/1967 | McMillan | 423—449 |
| 3,574,548 | 4/1971 | Sands et al. | 423—449 |
| 3,345,440 | 10/1967 | Googin et al. | 264—29 |

BENJAMIN R. PADGETT, Primary Examiner

I. GLUCK, Assistant Examiner

U.S. Cl. X.R.

106—122, 307; 264—29; 423—445, 448, 449